United States Patent [19]

Schaffling

[11] 4,131,051
[45] Dec. 26, 1978

[54] PROCESS FOR PREPARING A ROCKET MOTOR

[75] Inventor: Otto G. Schaffling, Cheshire, Conn.

[73] Assignee: Olin Corporation, New Haven, Conn.

[21] Appl. No.: 373,126

[22] Filed: May 21, 1964

Related U.S. Application Data

[62] Division of Ser. No. 143,275, Oct. 2, 1961, Pat. No. 3,965,676.

[51] Int. Cl.² .............................................. F42B 33/10
[52] U.S. Cl. ...................................... 86/1 R; 264/3 R
[58] Field of Search ...................... 86/1, 20.5; 102/98; 264/3

[56] References Cited

U.S. PATENT DOCUMENTS

| | | | |
|---|---|---|---|
| 2,479,470 | 8/1949 | Carr | 60/35 RS |
| 2,740,704 | 4/1956 | O'Neill | 102/98 |
| 3,012,508 | 12/1961 | Stanley | 102/98 |
| 3,046,829 | 7/1962 | Roemer | 86/61 |
| 3,054,253 | 9/1962 | Chung | 86/61 |

Primary Examiner—Harold Tudor
Attorney, Agent, or Firm—Donald R. Motsko; H. Samuel Kieser

EXEMPLARY CLAIM

1. In the process for preparing a rocket motor, the improvement which comprises applying a layer of an uncured organic material capable of being cured to a rubbery material, to the interior combustion chamber wall of a rocket vessel, partially embedding powder grains in the exposed surface of said uncured material before solidification, thereafter curing and solidifying said uncured material, whereby a rubber-base liner is formed having one surface firmly adhering to said wall and said powder grains firmly adhering to the exposed surfaces of said liner, with a portion of each powder grain protruding from said liner, filling the lined portion of the chamber with a thermoplastic propellant charge, and solidifying said propellant charge, whereby a firmly adhering bond is formed between the solidified propellant charge, the powder grains and the solidified liner.

9 Claims, 2 Drawing Figures

INVENTOR.
OTTO G. SCHAFFLING

BY H. Samuel Kiess

PROCESS FOR PREPARING A ROCKET MOTOR

The present application is a division of co-pending application Ser. No. 143,275, filed Oct. 2, 1961, now U.S. Pat. No. 3,965,676 by Otto G. Schaffling.

This invention relates to improvements in rocket motors and other gas generating devices which utilize solid propellents. More particularly, this invention relates to improvements in bonding characteristics between the insulating liner of rocket motor combustion chamber walls and the propellant charge contained within the chamber.

Rocket motors are generally comprised of a suitable vessel having a nozzle in one end thereof, a combustion chamber containing a propellant charge, and an ignition system capable of igniting the propellent charge when desired. Control of the thrust throughout the combustion period of the propellant may be obtained by shaping of the propellant to give burning surfaces that will yield the desired thrust program during the combustion period. The use of propellants in the form of a rod, rod with internal star, hollow rod, multiple port rod, and the like, for this purpose is well known in the art. In addition, certain desired surfaces of the propellant may be coated with a suitable inhibitor to suppress burning of these surfaces, thereby providing another means of controlling the thrust. One method of inhibiting the burning surface of the propellant comprises coating the interior surfaces of the combustion chamber, after suitable surface preparation, with an insulating binder, and the exterior periphery of the propellant, by casting or otherwise is then secured to the interior combustion chamber surfaces by means of the insulating binder. The insulating binder may be used for several purposes. It may serve as an insulator for the rocket vessel to protect it against the high temperatures generated during combustion. It may serve as a binder to secure the propellant to the wall of the combustion chamber. In addition, it may be used to inhibit burning of the outer periphery of the propellant. Considerable difficulty has been encountered in obtaining a satisfactory liner material that will serve all three purposes. Various elastomeric materials have been used as the insulating liner, but the bond between the liner and propellant often fails if the rocket is stored for extended periods after fabrication or if the rocket is subjected to extreme variations in temperature conditions prior to or during firing. Therefore it is necessary to fire such rockets very soon after fabrication, and expensive and combersome means must be employed to maintain the temperature of the rocket relatively constant prior to firing. Unless these precautions are taken, there may be failure of the bond between the liner and propellant, which results in uncontrolled burning of the propellant during the combustion period. Such uncontrolled burning not only causes undesired variations in the thrust program, but also may cause rupture and/or explosion of the rocket vessel. In addition, when nitroglycerine is employed as a component of the propellant, there is a migration of the nitroglycerine through the propellant and liner to the chamber wall, which often causes failure of the bond between the liner and wall, thereby resulting in uncontrolled burning of the propellant.

It is a primary object of this invention to overcome the disadvantages inherent in conventional techniques for bonding rocket motor liners and rocket motor propellant charges.

A further object of this invention is to provide an improved rocket motor.

Still another object of this invention is to provide an insulating liner for the combustion chamber of rocket motors having improved bonding properties.

It is another object of this invention to provide an improved process for preparing rocket motors.

Still a further object of this invention is to provide a rocket motor combustion chamber having an insulating liner bonded to the propellant charge, wherein the bond between the liner and the propellant charge resists deterioration during extended periods of storage.

Another object of the invention is to provide a novel rocket motor liner which remains firmly bonded to the propellant when subjected to extreme variations in temperature.

It is a further object of the invention to provide a novel insulating liner for rocket motors which inhibits migration of nitroglycerine from propellants containing it.

These and other objects of the invention will be apparent from the following detailed descriptin thereof.

It has now been discovered that improved bonding between a rubbery liner of a rocket motor combustion chamber and a solid propellant charge is readily obtained by coating the interior surfaces of the combustion chamber with a layer of a liquid organic material capable of being cured and solidifed to a material having rubbery properties, and before the binder has solidified, sprinkling solid powder particles on the exposed surfaces of the binder, whereby the solid particles become partially embedded therein, and then curing and solidifying the rubbery liner composition. The terms "partially embedded" and "partially embedding" are used throughout the description and claims to define the partial penetration of the rubbery liner with a portion of each of the powder particles, leaving an outer portion of each powder particle protruding from the rubbery liner. After curing and solidification of the rubbery liner having the powder particles partially embedded therein, a thermoplastic propellant charge is then cast into the lined portion of the chamber, and upon solidification of the propellant charge, a strongly adhering bond is formed between the rubbery liner, the powder particles and the propellant charge.

Figure 1:
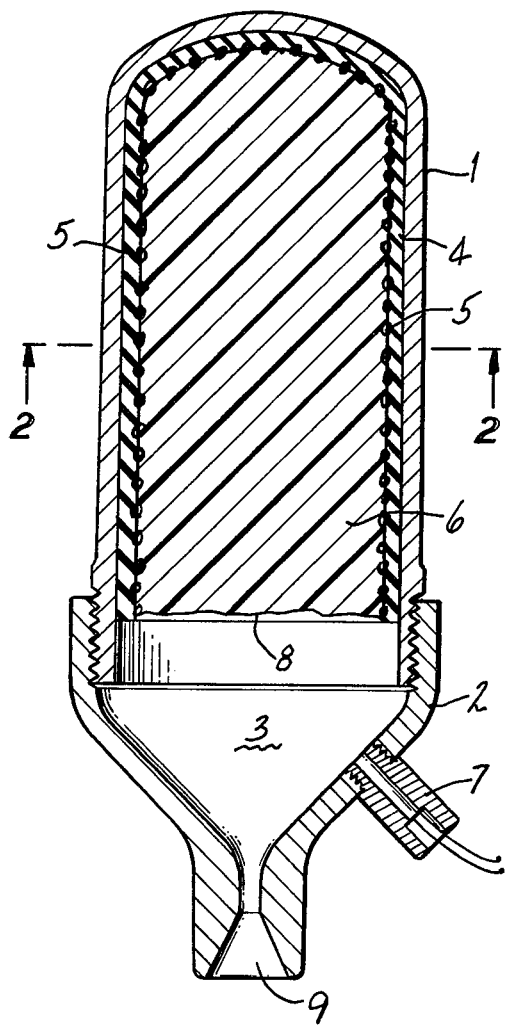
FIG. 1 is a sectional elevational view of the novel rocket motor of this invention.

Referring to FIG. 1, the rocket motor there shown comprises a shell 1 constructed of steel, aluminum, or other suitable metal or material of construction. Shell 1 has a cap 2 formed of the same or similar material used to construct shell 1. Cap 2 encloses a combustion chamber 3. A major portion of combustion chamber 3 is filled with a charge comprised of liner 4, powder particles 5 and solid propellant 6. Each powder particle 5 is partially embedded in liner 4 and partially embedded in solid propellant 6. Ignition device 7, secured to cap 2, is also provided and may be of any design which will provide for ignition of solid propellant 6 at the desired time. The ignition device 7 shown in the drawing is an electric squib which when subjected to an electric current provides combustion products and/or flame which impinge on exposed surface 8 of solid propellant 6 to effect ignition thereof, and the resulting ignition forms gaseous combustion products which are discharged through nozzle opening 9.

Figure 2:
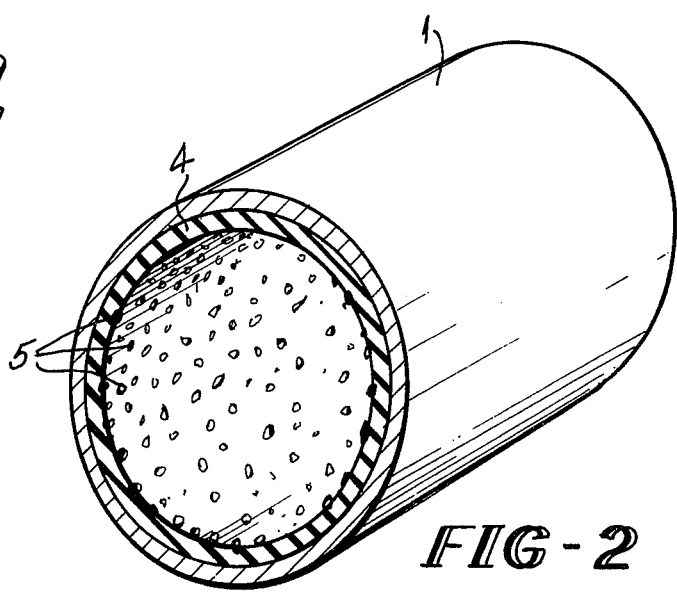
FIG. 2 is a sectional isometric view through plane 2—2 of FIG. 1, prior to the addition of the solid propellant.

FIG. 2 shows the rocket motor prior to the addition of the solid propellant 6. As shown therein, liner 4 is bonded to the internal surface of shell 1. Powder particles 5 are embedded in liner 4 such that a portion of each powder particle 5 has an outer portion protruding from liner 4.

More in detail, rocket motor vessels, gas generator vessels, and the like, constructed of a suitable material such as steel alloy, stainless steel, aluminum alloy, low carbon steel, ceramic lined steel, molded epoxy resin-coated glass fiber, and the like, may be treated in accordance with the technique of the instant invention. For purposes of clarity, the invention will be described as applied to rocket motor vessels, but it will be recognized by those skilled in the art that the invention is applicable to gas generators and other devices which employ solid propellants. The interior surfaces of the combustion chamber are cleaned by sanding and/or applying cleaning solvents to remove rust, grease and the like, to improve bonding between the interior combustion chamber surface and the liner.

The liner is formed from a liquid organic material capable of being cured and solidified to a material having rubbery properties. It is preferred to employ a mixture of an epoxy resin and a ruber-base material with conventional curing agents, since the epoxy resin component not only enhances the bonding strength of the liner but also impedes the migration of nitroglycerine from the propellant to the combustion chamber surfaces. However if the propellant does not contain nitroglycerine, satisfactory results can be obtained using conventional rubber-base materials.

The words "liquid" and "fluid" when used to define the organic material capable of being cured and solidified to a material having rubbery properties throughout the description and claims are intended to include solutions, dispersions, slurries or paste-like fluids having the consistency of conventional rubber-base cements.

Rubber-base materials suitable for use in preparing the liner of the instant invention include fluid polymers or copolymers of one or more rubber-forming diolefins, such as butadiene and including substituted butadienes such as isoprene, chloroprene, dimethyl butadiene, methyl pentadiene, and the like, with or without other suitable copolymerizable materials such as acrylic acid, styrene vinyl esters, acrylic esters, methacrylic esters, and the like. Liquid dispersions or solutions of natural rubber, "C" rubber, nitrile rubber, GRS rubber, neoprene, polysulfide rubber, cellulose acetate, and the like, which may be cured and solidified by the application of a curing agent and/or heat may be employed.

Curing agents for these rubber-base materials are well known in the art, and will vary with the type of rubber base material employed. For example, magnesium oxide, diphenylguanidine, p-quinonedioxime, peroxides, sulfur, and the like, are suitable curing agents.

The epoxy component of the rubbery liner of the present invention comprises liquid monomeric or polymeric polyepoxides containing a plurality of epoxide groups having the formula

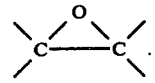

At least one of these groups in the polyepoxides is terminal. The polyepoxides may be saturated or unsaturated aliphatic, cycloaliphatic, aromatic or heterocyclic and may carry non-interfering substituents, for example, chlorine, hydroxyl or ethyl groups. The polyepoxides are commonly formed by any of several reactions. One type is derived by the reaction of aromatic or aliphatic polyhydroxy compounds with epichlorohydrin. Also useful in place of epichlorohydrin are 3-chloro-1,2-epoxybutane, 3-bromo-1,3-epoxyhexane, 3-chloro-1,2-epoxyoctane and the like. To form the epoxy resins, the epoxide is reacted with an aliphatic or aromatic polyhydric compound, for example, bisphenol A, resorcinol or polynuclear phenols, for example, 4,4'-dihydroxybenzophenone or bis(4-hydroxyphenyl) ethane. Sorbitol, glycerol and pentraerythritol are examples of suitable polyhydroxy aliphatic compounds. Any of the commercially available epoxy resins are suitable for use in the present compositions including the resins sold under the names of Epon, Araldite, ERL and Epi-Rez. Epon 828 is an epoxy resin formed from bisphenol A and epichlorohydrin and has average molecular weights of 350 to 400 and viscosities of 5,000 to 15,000 centipoises at 25° C. (Gardner Holdt). Epon 834 is similar to Epon 828 but has molecular weights of about 450 and viscosities between $A_1$ and $A_2$ (Gardner Holdt). Araldite 6010 is similar to Epon 828 but has a viscosity of 16,000 centipoises. ERL 2774 is similar to Epon 828 but has viscosities of 10,500 to 19,500 centipoises. Epi-Rez 510 is similar to Epon 828 but has viscosities of 9,000 to 18,000 centipoises.

Other suitable epoxies include the Oxiron, peracetic and Novolac types. The Oxiron resins are epoxidized aliphatic polyolefins which contain epoxy groups terminally and along the carbon chain. The peracetic resins are obtained by epoxidatin of olefins by oxygen and selected metal catalysts or by peracetic acid. Unox Epoxide 201 is a bicyclo-diepoxycarboxylate, Unox Epoxide 207 is bicylopentadiene dioxide and Unox Epoxide 206 is vinylcyclohexene dioxide. Novolac resin DER is an opoxidized polynuclear polyhydric phenol. Additional data concerning these resins appears in Lee and Neville, "Epoxy Resins, Their Application and Technology," McGraw-Hill Book Company, Inc., New York, 1957.

The uncured liquid organic material used in the preparation of the liner is prepared by admixing the rubber-base material with the epoxy component in a weight ratio of rubber-base material to epoxy component of preferably between about 1:1 and about 5:1. As discussed above, the epoxy component may be omitted under certain circumstances. However, when the ratio is less than about 1:1, the high epoxy content may eliminate most of the desirable elasticity properties from the liner.

Curing agents are added in a proportion up to about 20 percent by weight of the liquid organic material and preferably between about 10 and about 15 percent by weight.

The liquid organic material capable of being cured and solidified to a material having rubbery properties, with or without an epoxy component, as the case may be, is applied to the interior surfaces of the combustion chamber by any suitable means, such as by brushing, by applying with a spatula, and the like. If desired the organic material may be formed or mixed with a suitable solvent such as ethyl acetate, acetate, or hexane, then the solution of organic material is sprayed onto the interior surfaces of the combustion chamber, and the solvent is evaporated to yield a rubbery liner. In one embodiment of the invention the cylindrical rocket motor vessel is placed on motor driven rollers or other suitable apparatus to rotate the rocket motor at a rate sufficient to develope the necessary centrifugal force to maintain a substantially uniform thickness of the layer of organic material solution on the interior of the vessel until it is cured sufficiently to retain its layer form without rotation. Application and rotation is continued until the desired thickness of rubber-base liner is obtained. The thickness of the rubber-base lining is preferably between about 1/32 and about ¼ inches, but any suitable thickness that will impart the desired degree of insulation to the combustion chamber vessel may be employed.

If desired, several layers of rubber-base material and epoxy resin may be employed to form the liner. For example, the combustion chamber wall is coated with a layer of the above defined liquid organic material, and after curing, a thin layer of epoxy resin is applied. After curing another layer of the liquid organic material is applied, which is coated with the powder particles, before curing, as defined below. Such a composite liner is particularly suitable for inhibiting the migration of nitroglycerin from propellants containing it.

Before complete solidification of the organic rubber-base material is effected, solid powder grains are sprinkled on the exposed surface of the rubber-base lining. It is preferred to apply the solid powder grains immediately after applying the rubber-base liner to the combustion chamber vessel. However, the solid powder grains may be applied at any time as long as the rubber-base liner is still tacky and is not yet solidified. Generally a period of time up to about 10 minutes after applying the rubber-base liner to the combustion chamber is the maximum period in which satisfactory adhesion between the rubber-base liner and the solid powder grains can be obtained. Materials suitable for use as the powder grains include grains of nitrocellulose powder prepared by either the well known "extrusion" process or the "Ball powder" process, cellulose acetate grains, methyl cellulose grains, ethyl cellulose grains, benzyl cellulose grains, polystrene grains, polyvinyl chloride grains, polymethyl methacrylate grains, and mixtures thereof.

Powder grains having an average diameter between about 0.01 and about 0.2 inches, and preferably between about 0.025 and about 0.05 inches are employed. However, grains with an average diameter slightly smaller or slightly larger than these diameter ranges may be employed, the larger grains being employed when the thicker liners are used.

Sufficient powder grains are applied to the rubber-base liner to coat between about 50 percent and about 95 percent, and preferably between about 65 and about 85 percent of the exposed liner area. The grains are distributed substantially uniformly over the entire liner area, without completely coating the liner.

The powder grains may be applied to the exposed surface of the rubber-base liner by sprinkling by hand, by mechanical means, or by any other suitable technique. In one embodiment the rocket motor vessel is positioned with its longitudinal axis in a substantially horizontal position, (the rocket motor vessel having the incompletely cured rubber-base liner applied to the combustion chamber), then rotated about its longitudinal axis, and powder grains are then forced through a perforated distributor pipe positioned parallel to the longitudinal axis of the rocket motor vessel on the interior of the combustion chamber, but removed from the rubber-base liner. However, any other suitable means of applying the solid powder grains to the exposed surface of the rubber-base liner may be employed.

The rate of application of the solid powder grains is such that sufficient powder grains are applied to obtain coverage of the surface of the rubber-base liner within the above defined ranges before solidification of the rubber-base liner is effected. The rate of solidification of the liner is determined by the proportion and type of curing agent employed and the temperature at which curing is effected. When the solid powder grains are applied to the rubber-base liner in this manner, a major portion of the powder grains become partially embedded in the rubber-base liner and protrude from the surface of the liner. A small portion of the powder grains will become completely embedded in the rubber-base liner and a negligible portion of the powder grains may not adhere to the surface of the rubber-base liner. These non-adhering powder grains are preferably removed from the combustion chamber prior to adding a propellant charge as described more fully below.

After applying the powder grains to the liner in this manner, solidification of the rubber-base liner is completed, due to the effect of the curing agent, with or without heating. It is preferred to employ a curing agent and complete curing of the liner at ambient temperature for a period at least about 12 hours and as long as about 10 days or more. However, solidification of the liner may be effected at elevated temperatures, for example, up to about 80° C., in less than about 6 hours.

Rocket motor casings lined and powdered in accordance with the technique of the instant invention may be stored for extended periods, for example, as long as 90 days before adding the propellant charge, without adversely affecting the bonding characteristics of the liner to the propellant.

Any thermoplastic propellant charge may be employed that is capable of being poured and cast inside of the combustion chamber of the rocket motor and subsequently solidified by curing. Suitable propellant charges include the rubber-base and asphalt-base propellants containing oxidizers such as ammonium perchlorate, potassium perchlorate, ammonium nitrate, and the like; propellants such as nitrocellulose, nitroglycerine, cyclonite, pentaerythrite tetranitrate and mixtures thereof; and metal additives such as powdered aluminum, boron, copper and mixtures thereof. A typical analysis of a suitable thermoplastic propellant composition is as follows:

| Component | Parts by Weight |
|---|---|
| Nitrocellulose | 58.6 |
| Nitroglycerin | 24.2 |
| Dimethyl Phthalate | 9.6 |
| Dinitrotoluene | 6.6 |
| Ethyl Centralite | 1.0 |
| Carbon Black | 0.1 |

Other suitable solid propellant compositions such as double base propellants, composite double base propellant and those set forth in *Rocket Propulsion Elements,* by George P. Sutton, published by John Wiley and Sons, Inc., Second Edition (1956), may be employed.

The shape of the propellant may be in the form of a rod, hollow rod, star, etc., or other desired shape that can be cast in accordance with prior art techniques.

After solidification of the propellant charge a suitable closure means having a nozzle for discharging combustion gases is then secured to the open end of the chamber. A suitable ignition means is also provided in the conventional manner.

When solid propellant grains are applied to the interface between a rubber-base liner and a castable propellant charge in accordance with the instant invention, an exceptionally strong bond is obtained between the rubber-base liner and the propellant charge, and substantially no rupturing of the bond is effected during storage, during extreme temperature variations, or when the propellant charge is ignited. As a result, substantially uniform burning and uniform thrust are obtained throughout the entire combustion period. In addition, it has been found that rocket motors prepared in this manner can be stored indefinitely without any significant deterioration in the bond between the rubber-base liner and the propellant charge. Furthermore, when subjected to extreme temperature variations, for example, cycling tests in which the rocket motors are stored at a temperature of $-40°$ C. for 24 hours, then removed and immediately placed in an atmosphere at 60° C., and maintained in this atmosphere for 24 hours, and then returned to storage at $-40°$ C., the rocket motors of the instant inventon resisted bond failure after being subject to more than 20 cycles.

In a preferred embodiment of the invention the powdering technique of the instant invention is applied to a liner of the type described in my copending application, Ser. No. 143,274, filed Oct. 2,1961. The liquid organic material containing epoxy resin, rubber-base material, and curing agent, prepared as defined above is admixed with an inorganic metal salt such as zinc chromate, the proportion of salt being equivalent to between about 2.5 and about 30 percent by weight of the liquid organic material. The resulting slurry is then applied to the combustion chamber wall as described above.

The following examples are presented to illustrate the invention more fully without any intention of being limited thereby. All aprts and percentages are by weight unless otherwise specified.

EXAMPLE I

A rubber-base lining composition was prepared as follows: 35 parts of an epoxy resin having a molecular weight of about 375 formed by reacting epichlorohydrin with bisphenol A, were admixed with 5 parts of powdered iron oxide until substantially homogeneous. To this mixture were added 52.3 parts of a copolymer of butadiene and acrylic acid, and mixing was continued until a substantially homogeneous mass was formed. A curing composition was prepared by admixing 5 parts of pequinonedioxime, 0.2 parts diphenylguanidine and 2.5 parts magnesium oxide, and the resulting homogeneous curing composition was then admixed with the resin-rubber-base-iron oxide mixture until substantially homogeneous. All mixing was carried out at room temperature.

A tensile testing apparatus was constructed which was comprised of two square steel plates, having a surface area on each face of 2.5 inch.$^2$, each plate being secured on one face to a pivot arm, which was operatively connected to a tensile strength measuring device. The unattached faces of the two plates are cemented together to form a "sandwich" of steel plate/rubber-base liner/thermoplastic propellant/rubber-base liner/steel plate. The pivot arms then force the steel plates apart, the force necessary to cause rupture of the "sandwich" being measured in pounds per square inch.

A portion of the fluid rubber-base composition, prepared as described above, was applied to the open face of each steel plate with a spatula to form a layer of substantially uniform thickness (about 1/32 inch). Nitrocellulose powder grains having an average diameter of about 0.0315 inches were then immediately sprinkled on the exposed surface of the rubber-base liner on each plate in an amount sufficient to cover about 75 percent of the exposed area. The nitrocellulose powder grains contained 88 percent nitrocellulose (12.6 percent N), 5 percent lead stearate, 2 percent 2-nitrodiphenylamine, and 5 percent dioctylphthalate.

The rubber-base liner, having nitrocellulose grains partially embedded therein, was cured at ambient temperature for 2 days. The two plates with rubber-base liner and powder grains were then cemented together with a ⅛ inch thickness of a thermoplastic composite double base propellant containing nitroglycerin, nitrocellulose, ammonium perchlorate, powdered aliminum and additives. The cementing was effected by placing the two lined plates vertical in a parallel position about ⅛ inch apart, then taping the bottom and two adjacent sides with a double thickness of masking tape to form a mold. The fluid propellant was then poured into the top of the mold to fill it, and the taped plates with propellant were heated to a temperature of 60° C. for about 24 hours to effect curing of the propellant. The sandwiches were then cooled to ambient temperature and the tape was removed.

After curing of the "sandwich," the plates were pulled apart in the tensile strength testing apparatus. The maximum tensile strength and position of the break were noted. The procedure was repeated for two additional "sandwiches" prepared in the same manner. The average tensile strength of the three specimens was 86 pounds per square inch, and in each test, the break in the sandwich occurred through the propellant, thus demonstrating that the bond formed by the technique of the instant invention between the liner and propellant was stronger than the bond of the propellant alone.

For purposes of comparison, the procedure was repeated, with the exception that no powder grains were added to the liner. The average tensile strength of the three specimens was only 66 pounds per square inch, and in each case the break occurred at the liner-propellant interface.

EXAMPLE II

A liner composition was prepared as in Example I, employing the following components in the following proportions:

| Component | Parts |
| --- | --- |
| Epoxy Resin (of Ex. I) | 32.5 |
| Zinc chromate | 7.5 |
| Butadiene-acrylic acid copolymer | 52.3 |
| p-quinonedioxime | 5.0 |
| diphenylguanidine | 0.2 |
| magnesium oxide | 2.5 |

Three "sandwich" specimens were prepared as in Example I, employing the same type of powder grains and the same type of propellant. The average tensile strength was 96 pounds per square inch, and the break occurred through the propellant in each instance.

EXAMPLE III

A rubber-base material prepared in the same manner as in Example II was applied to the interior surface of the combustion chamber of a 3 pound rocket motor which was comprised of a steel pipe of about 5 inches inside diameter and about 3 ½ inches in length, after sanding and solvent cleaning of the interior surface. A ring was secured at each end of the pipe, the opening in each ring having a diameter of ¼ inch less than the pipe, and the resulting assembly was placed in a lathe chuck and rotated at the rate of about 120 rpm. The liquid rubber-base material was then fed to the interior of the vessel, a spatula was placed in contact with both rings to spread the material in a substantially even layer of about ⅛ inch thickness and to remove excess material by scraping. Nitrocellulose powder grains of the type used in Example I were sprinkled on the liner immediately to cover about 75 percent of the exposed area. Rotation was stopped after solidification of the liner was finished and the liner was cured in the rocket motor at ambient temperature for 51 days. The rings were removed, the edges of the liner squared, and the rocket motor was filled with the thermoplastic propellant of Example I. A star mandral was placed along the axis of the motor to form a "star" propellant. After curing the propellant, the motor was cycled between −40° C. and 60° C. for 24 hour periods for more than 18 cycles without failure of the liner-propellant bond. Several test motors prepared in this manner were fired successfully after 3 to 6 temperature cycles.

EXAMPLE IV

A 70 pound JATO rocket motor was prepared, employing a rubber-base material similar to that of Example III, with the exception that the rubber-based liner contained 5.0 parts of zinc chromate and 35 parts of the epoxy resin. The rocket motor casing was placed on rollers and rotated at a rate of about 60 rpm. The paste-like rubber-base material was applied with a spatula to the interior surfaces of the combustion chamber to yield, after curing and solidification, a rubbery liner of about 150 inches in thickness. The propellant of Example I was then cast in the rocket and cured. The completed rocket motor was subjected to two cycles at temperatures between −40° C. and 60° C. for 24 hour periods without failure of the bond between the liner and metal or liner and propellant.

EXAMPLE V

A liner composition was prepared as in Example I, employing the following components in the following proportions:

| Component | Parts |
| --- | --- |
| Epoxy resin of Ex. I | 32.5 |
| Zinc chromate | 7.5 |
| Butadiene-acrylic acid copolymer | 52.3 |
| p-quinonedioxime | 5.0 |
| diphenylquanidine | 0.2 |
| magnesium oxide | 2.5 |

Three "sandwich" sepcimens were prepared as in Example I, except that cellulose acetate particles were used instead of nitrocellulose grains, and the rubber-base liner was cured for four days instead of 2 days. The average tensile strength was 103 pounds per square inch, and the break occurred through the propellant in each instance.

EXAMPLE VI

A procedure similar to Example I was employed with the exception that a polysulfide type rubber was employed as a liner in the preparation of three "sandwich" specimens, employing the powder grains of Example I. The average tensile strength was 49 psi., and substantially all of the break was through the propellant. For purposes of comparison, employing the polysulfide type rubber without any powder being sprinkled on the liner, an average tensile strength of only 15 psi. was obtained and the break occurred at the liner-propellant interface.

It will be recognized that many modification and variations, some of which are discussed above, will naturally present themselves to those skilled in the art without departing from the spirit of this invention or the scope of the appended claims.

Having thus described the invention,
What is claimed is:

1. In the process for preparing a rocket motor, the improvement which comprises applying a layer of an uncured organic material capable of being cured to a rubbery material, to the interior combustion chamber wall of a rocket vessel, partially embedding powder grains in the exposed surface of said uncured material before solidification, thereafter curing and solidifying said uncured material, whereby a rubberbase liner is formed having one surface firmly adherng to said wall and said powder grains firmly adhering to the exposed surfaces of said liner with a portion of each powder grain protruding from said liner, filling the lined portion of the chamber with a thermoplastic propellant charge, and solidifying said propellant charge, whereby a firmly adhering bond is formed between the solidified propellant charge, the powder grains and the solidified liner.

2. The process of claim 1 wherein said powder grains have a diameter between about 0.01 and about 0.2 inches.

3. The process of claim 1 wherein the amount of said powder grains is sufficient to cover between about 50 and about 95 percent of the exposed area of said uncured material.

4. The process of claim 1 wherein said uncured organic material is a mixture of an epoxy resin, a copolymer of butadiene and acrylic acid, and a curing agent.

5. The process of claim 1 wherein said powder grains are nitrocellulose powder grins.

6. The process of claim 1 wherein said uncured organic material contains between about 2.5 and about 30 percent by weight of an inorgaic metal salt.

7. The process of claim 6 wherein said metal salt is zinc chromate.

8. The process of claim 1 wherein said uncured organic material is a mixture of an epoxy resin, a copolymr of butadiene and acrylic acid, a curing agent, and zinc chromate in a proportion equivalent to between about 2.5 and about 30 percent by weight of said mixture, and wherein said powder grains are nitrocellulose powder grains having an average diameter between about 0.01 and about 0.20 inches.

9. The process of claim 1 wherein said uncured organic material is admixed with a solvent therefore, the resulting solution is sprayed onto the interior combustion chamber wall, and the solvent is evaporated prior to applying the powder grains.

* * * * *

UNITED STATES PATENT OFFICE
CERTIFICATE OF CORRECTION

PATENT NO. : 4,131,051
DATED : Dec. 26, 1978
INVENTOR(S) : Otto G. Schaffling

It is certified that error appears in the above-identified patent and that said Letters Patent are hereby corrected as shown below:

Col. 2, line 22: "descriptin", should read --description--
Col. 3, line 27: "ruber", should read --rubber--
Col. 4, line 36: "epoxidatin", should read --epoxidation--
Col. 7, line 41: "aprts", should read --parts--
Col. 8, line 21: "aliminum", should read --aluminum--
Col. 9, line 43: "150 inches", should read --1/8 inch--
Col. 9, line 64: "sepcimens", should read --specimens--
Col. 10, line 30: "adherng", should read --adhering--
Col. 10, line 49: "grins", should read --grains--
Col. 10, line 52: "inorgaic", should read --inorganic--

Signed and Sealed this

Seventh Day of July 1981

[SEAL]

Attest:

RENE D. TEGTMEYER

*Attesting Officer*     *Acting Commissioner of Patents and Trademarks*